United States Patent
Bendahan et al.

(12) 
(10) Patent No.: US 11,802,988 B2
(45) Date of Patent: Oct. 31, 2023

(54) DOSE-CONTROLLED VEHICLE INSPECTION

(71) Applicant: Smiths Detection Inc., Edgewood, MD (US)

(72) Inventors: Joseph Bendahan, San Jose, CA (US); Alan Henley, Alcoa, TN (US)

(73) Assignee: Smiths Heimann SAS, Vitry-sur-seine (FR)

( * ) Notice: Subject to any disclaimer, the term of this patent is extended or adjusted under 35 U.S.C. 154(b) by 0 days.

(21) Appl. No.: 17/211,183

(22) Filed: Mar. 24, 2021

(65) Prior Publication Data
US 2021/0302614 A1  Sep. 30, 2021

(30) Foreign Application Priority Data
Mar. 25, 2020 (GB) .................................... 2004327

(51) Int. Cl.
*G01V 5/00* (2006.01)
(52) U.S. Cl.
CPC .......... *G01V 5/0025* (2013.01); *G01V 5/0066* (2013.01)
(58) Field of Classification Search
CPC .. G01V 5/0066; G01V 5/0041; G01V 5/0016; G01V 5/0091; G01V 5/0008; G01V 5/005; G01V 5/0033; G01V 5/0025; G01V 5/00; G01V 5/0083; G01V 5/0075; G21K 1/02; G21K 1/093; G21K 1/10; G21K 1/025; G21K 1/043; H01J 35/30; H01J 37/14; H01J 37/3178; H01J 35/147;
(Continued)

(56) References Cited

U.S. PATENT DOCUMENTS 8,275,091 B2   9/2012   Morton et al.
8,295,433 B2 *  10/2012   Linev ................... G01V 5/0033
                                                       378/57
(Continued)

FOREIGN PATENT DOCUMENTS

CN       204287511 U    4/2015
EP        3040742 A1    7/2016

OTHER PUBLICATIONS

International Search Report and Written Opinion for International Patent Application No. PCT/US2021/023906, dated Jun. 28, 2021, 11 pages.
(Continued)

*Primary Examiner* — Irakli Kiknadze
(74) *Attorney, Agent, or Firm* — Armstrong Teasdale LLP

(57) ABSTRACT

A method for inspecting at least one vehicle with an inspection system, the inspection system and the at least one vehicle being configured to move relative to one another during an inspection of at least one part of the vehicle, the method including controlling, by a controller, an inspection dose of inspection radiation generated by a radiation source such that, during the inspection of the at least one part of the vehicle by the inspection radiation, the inspection dose remains substantially equal to a predetermined inspection dose, wherein controlling the inspection dose includes the controller obtaining information representative of a speed of the relative movement of the system and the vehicle during the inspection of the at least one part of the vehicle, and the controller controlling the radiation source, based on the obtained information.

17 Claims, 3 Drawing Sheets

Figure 1:
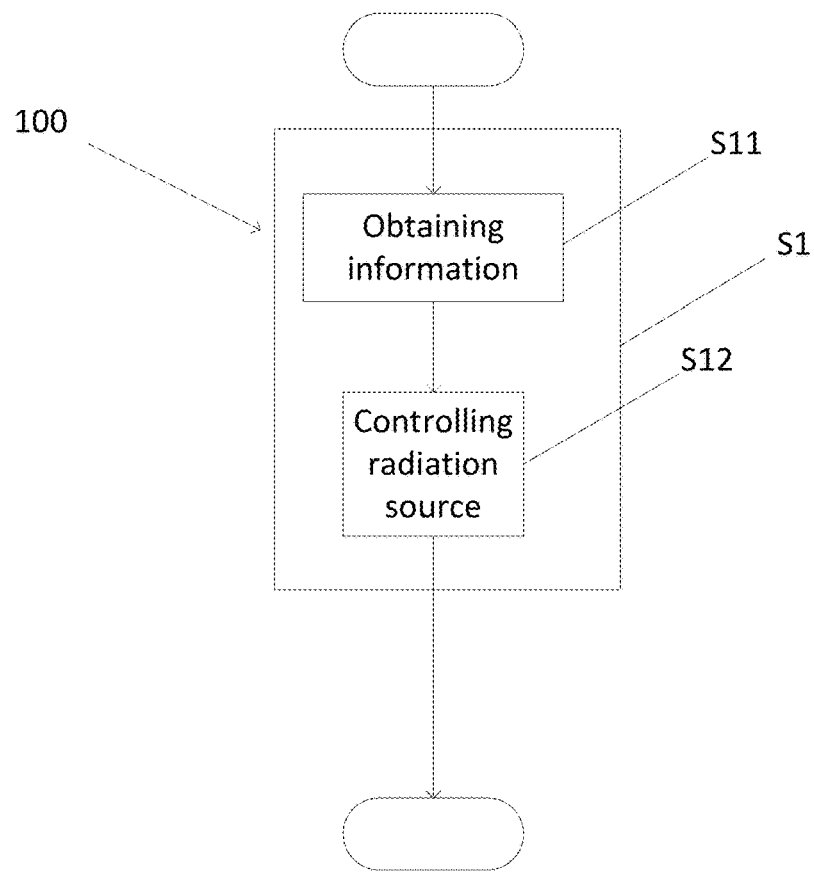

(58) Field of Classification Search
CPC ...... H01J 35/32; H01J 37/1472; H01J 37/141;
H01J 2235/081; H01J 2235/086; H01J
37/1475; H01J 35/08; H01J 37/147; H01J
37/023; H01J 35/106; H01J 35/1024;
H01J 2235/1279; H01J 2235/1053; H01J
2235/1026; H01J 2235/127; G01T 3/00;
G01T 3/06; G01T 1/1603; G01T 1/29;
H05G 1/52; H05G 2/00; H05G 1/70;
H05G 1/02; G01N 23/04; G01N 23/10;
G01N 23/046; G01N 23/203; G01N
2223/316; G01N 2223/32; G01N
2223/3303; G01N 2223/053; G01N
2223/405; G01N 2223/1016; G01N
2223/313; G01N 23/06; G01N 23/02;
G01N 23/16; G01N 23/18; G01N 23/083;
G01N 2223/643; G01N 2223/639; G01N
23/041; G01N 2223/401; G01N
23/20008; G01N 23/20083; G01N
2223/423; B07C 5/3416; H01M 50/417;
H01M 50/403; G06T 7/60; G06T 7/001;
G06T 7/0004; G06T 1/0007; G06T
2207/10116; G06V 10/757; G06V 20/52;
G06Q 10/083; G06Q 10/0838; G08B
13/194
USPC ...................................................... 378/57, 62
See application file for complete search history.

(56) References Cited

U.S. PATENT DOCUMENTS

| | | | |
|---|---|---|---|
| 9,025,731 | B2 | 5/2015 | Kotowski et al. |
| 9,052,264 | B2* | 6/2015 | Bendahan ............... G01N 23/04 |
| 9,052,403 | B2 | 6/2015 | Morton et al. |
| 9,086,496 | B2 | 7/2015 | Shedlock et al. |
| 9,086,497 | B2* | 7/2015 | Bendahan ............. G01V 5/0016 |
| 9,218,933 | B2 | 12/2015 | Langeveld et al. |
| 9,835,756 | B2 | 12/2017 | Morton |
| 2011/0222733 | A1 | 9/2011 | Smith |
| 2012/0068092 | A1 | 3/2012 | Tay |
| 2013/0195244 | A1 | 8/2013 | Hosokawa |
| 2015/0139386 | A1 | 5/2015 | Star-Lack et al. |
| 2015/0219785 | A1 | 8/2015 | Tudor et al. |
| 2016/0025891 | A1 | 1/2016 | Morton |
| 2016/0033674 | A1 | 2/2016 | Allman et al. |
| 2018/0341039 | A1 | 11/2018 | Karas et al. |
| 2019/0187324 | A1* | 6/2019 | Vienne ................... G01N 23/10 |
| 2021/0372949 | A1* | 12/2021 | Schubert ............... G01N 23/04 |

OTHER PUBLICATIONS

International Search Report and Written Opinion, dated Jun. 4, 2021, for International Application No. PCT/US2021/023912, 12 pages.

Search Report issued in GB Application No. 2004327.9, dated Aug. 28, 2020, 3 pages.

* cited by examiner

DOSE-CONTROLLED VEHICLE INSPECTION

CROSS-REFERENCE TO RELATED APPLICATIONS

This patent application claims priority to GB Application No. 2004327.9 filed on Mar. 25, 2020, the disclosure of which is hereby incorporated by reference herein in its entirety as part of the present application.

FIELD OF INVENTION

The present disclosure relates, but is not limited, to methods and systems for inspecting a vehicle, e.g. including a cabin configured to be occupied by at least one person, an engine and cargo.

BACKGROUND

Inspection systems use radiation through vehicles for inspecting cargo of the vehicle, for example to detect hidden objects, such as weapons, dangerous materials, explosives, drugs and general contraband. The inspection systems may be placed at borders and at the entrance of sensitive facilities. X-rays are typically used for inspection radiation, because X-rays penetrate the vehicles and allow seeing contraband concealed within the car in a non-intrusive way.

Strict regulations limit the dose to which people (e.g. drivers and passengers) of the vehicles may be exposed.

In a "scanning" mode of inspection, the drivers and the passengers of the vehicles usually step down of the vehicles in order to avoid being irradiated and the inspection systems (e.g. including a gantry with the X-ray source and detectors) move with respect to the vehicles to inspect them. The scanning mode has a relatively small overall vehicle throughput of inspection (around 20 or 25 vehicles per hour), and the inspection systems are relatively expensive because they must be configured to be mobile. In a "car-wash" mode of inspection, the X-ray source and detectors are stationary and the vehicle is translated. The "car-wash" mode also has a relatively small overall vehicle throughput of inspection. The scanning mode and the "car-wash" mode are non-compatible with well transited border crossings.

A higher throughput (e.g. between 100 and 200 vehicles per hour) may be obtained in a "pass-through" mode of inspection, where the driver may stay in the vehicle and drives the vehicle through a portal with the X-ray source and detectors. In some examples, radiation emission only starts after the cabin has passed a zone of inspection—but the cabin is not inspected, which prevents detection of hidden objects in the cabin. In some examples, the drivers and any passengers are exposed, while they are driving through the portal, to a radiation dose and the cabin is inspected. The radiation dose to which the drivers and passengers are exposed should not exceed a maximum dose allowed by radiation regulations. The radiation source could be configured to have an allowed maximum radiation dose for a given nominal inspection driving speed of the vehicle through the portal. However, drivers may not drive at the nominal inspection driving speed. Driving at lower speeds may result in a dose that exceeds the maximum dose. Driving at higher speeds may result in lower dose, as lower dose could result in dark areas in a corresponding inspection image where the presence e.g. of contraband may not be determined.

Aspects of the present disclosure address some of the above issues.

SUMMARY OF INVENTION

Aspects and embodiments of the disclosure are set out in the appended claims. These and other aspects and embodiments of the disclosure are also described herein.

PRESENTATION OF THE FIGURES

Figure 2:
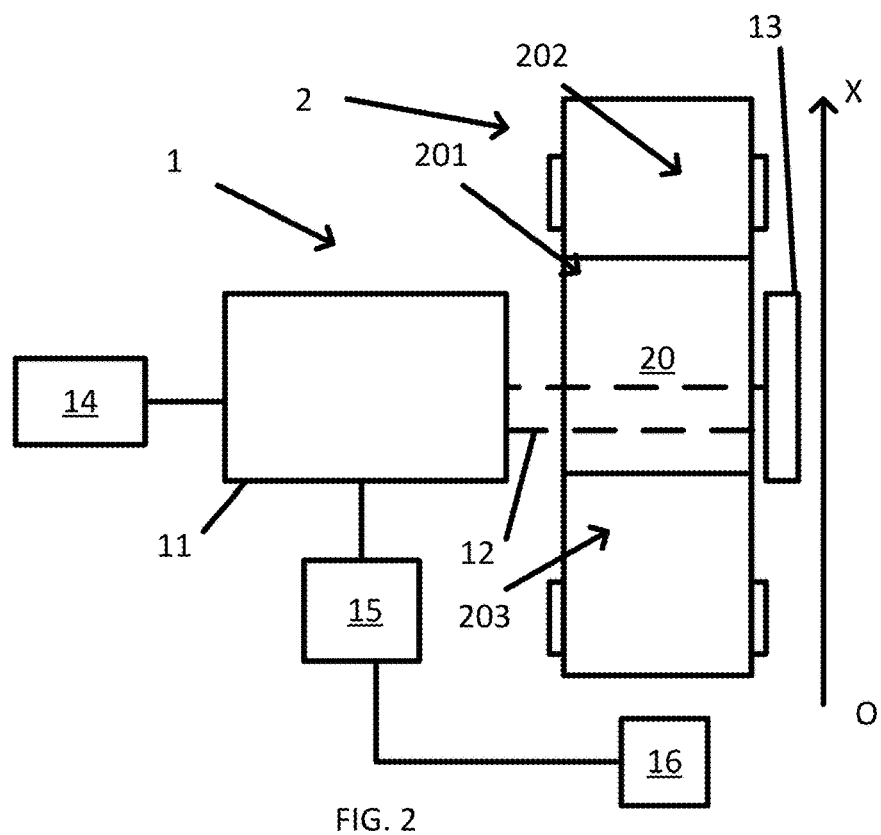
Figure 3C:
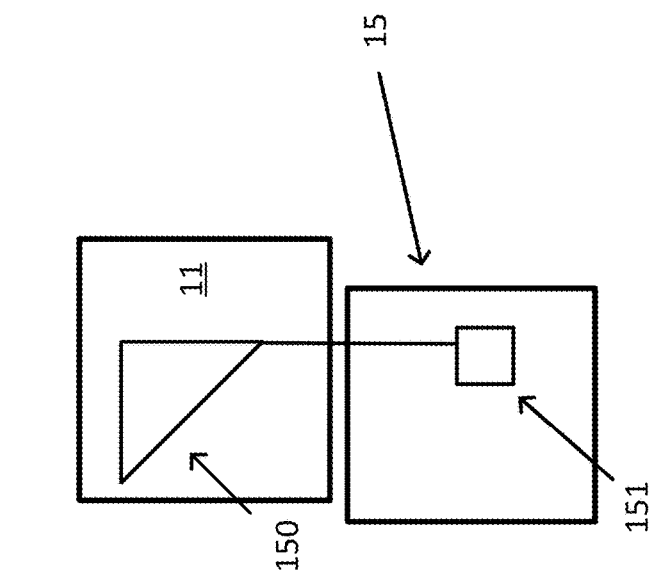
Figure 3B:
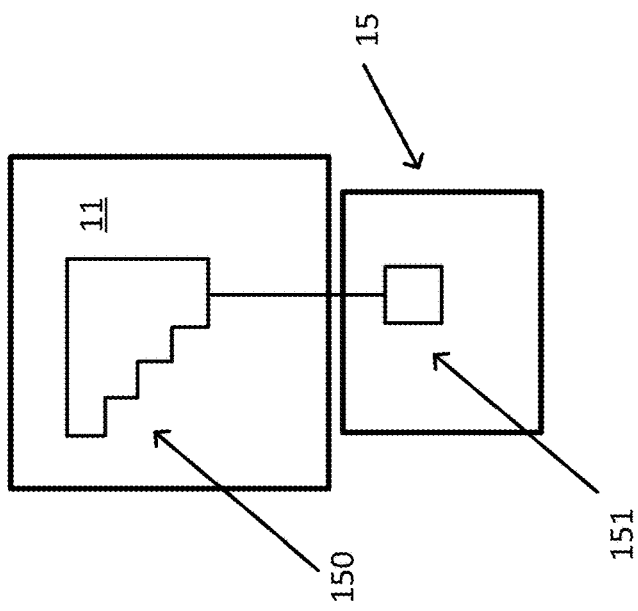
Figure 3A:
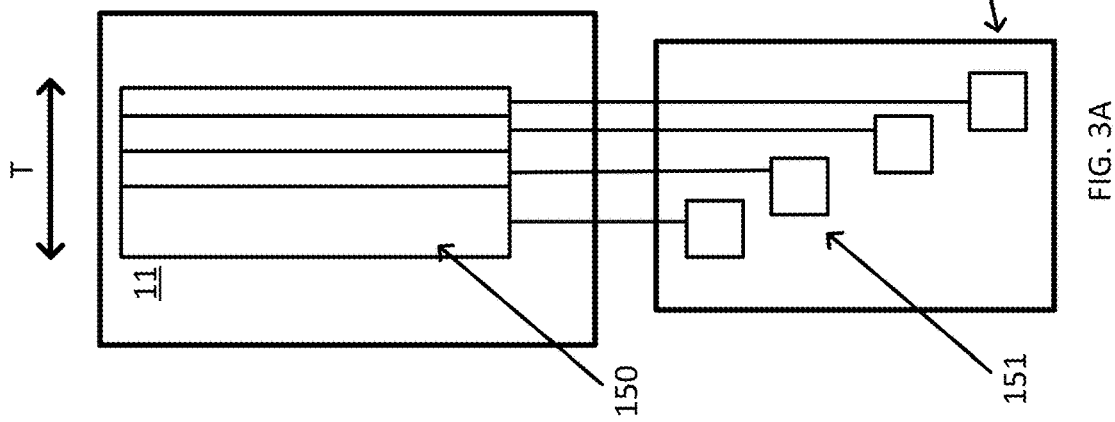
Figure 4:
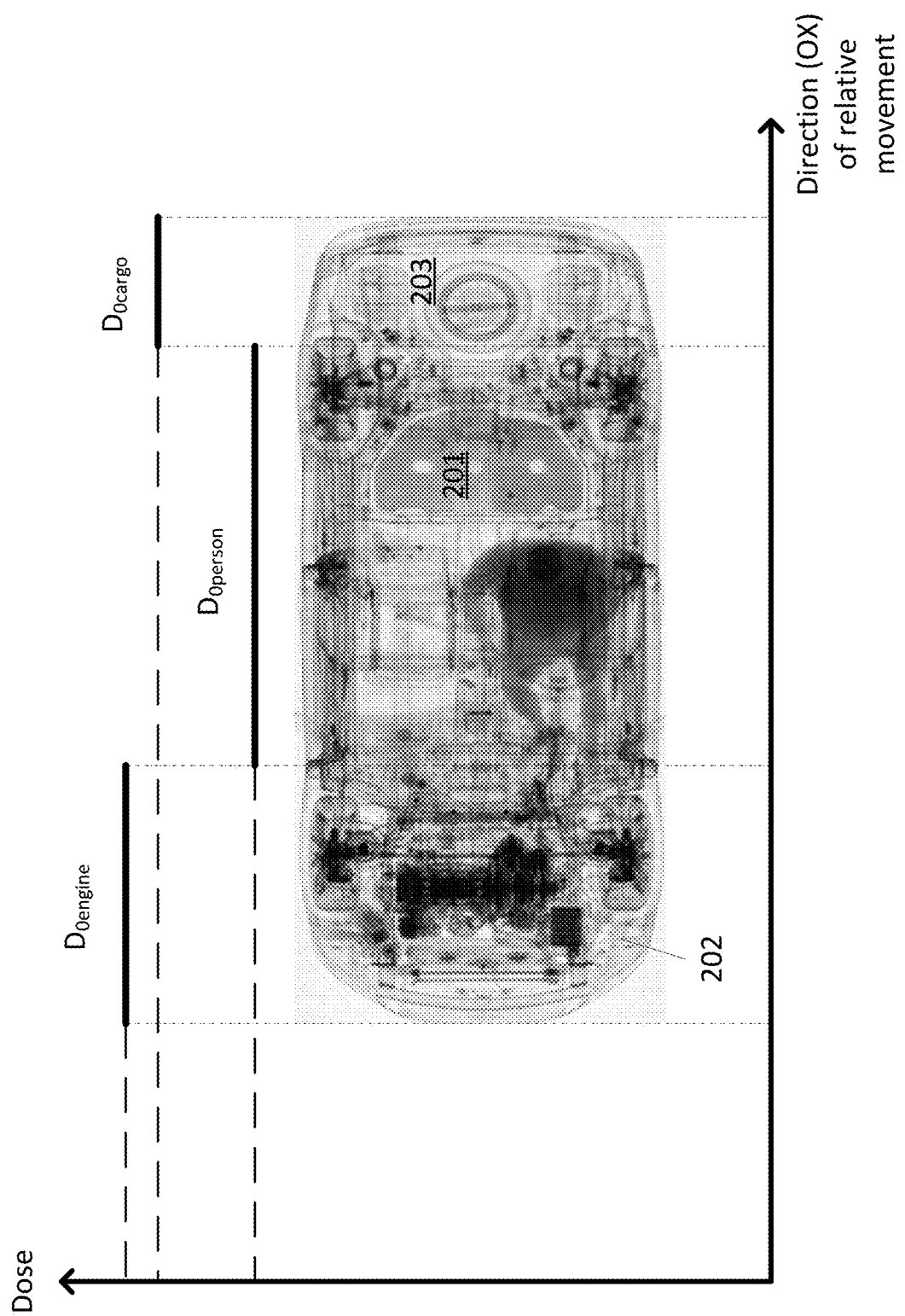

Embodiments of the disclosure will now be described, by way of example only, with reference to the accompanying drawings, in which:

FIG. 1 is a flowchart that schematically illustrates an example method for inspecting a vehicle;

FIG. 2 schematically illustrates an example inspection system;

FIGS. 3A to 3C schematically illustrate examples of a radiation source including a filter and a controller including an actuator; and FIG. 4 schematically illustrates an example of control of the inspection dose based on obtained information, with the inspection dose being different as the vehicle moves relative to the inspection system.

In the drawings, like elements are referred to by the same numerical references.

DESCRIPTION OF EXAMPLE EMBODIMENTS

Overview

The disclosure is concerned with a method for inspecting at least one vehicle with an inspection system. To enable inspection using a scan movement, the inspection system and the vehicle may move relative to one another during an inspection of the vehicle. The vehicle is inspected using inspection radiation having an inspection dose. The inspection dose is controlled such that the inspection dose remains substantially equal to a predetermined inspection dose. The controlling of the inspection dose includes obtaining information representative of a speed of the relative movement of the system and the vehicle during the inspection. The controlling of the inspection dose also includes controlling a radiation source generating the inspection radiation, based on the obtained information.

In embodiments of the disclosure, e.g. when inspecting an area of the vehicle which is occupied by people, such as a cabin of the vehicle, and drivers drive at speeds lower than the nominal inspection driving speed, the radiation source is controlled based on information representative of the speed of the vehicle, and the dose remains substantially equal to a predetermined dose, which may be equal to or slightly lower than the maximum dose allowed to expose passengers in a single scan by the regulations (e.g. a regulatory dose). The regulations limit the allowed dose received by people. The dose received by people is obtained by multiplying the inspection dose rate (i.e. the dose per unit of time, e.g. mSv/hour) by the time the person is exposed to the radiation. By reducing the inspection dose rate when the exposure time is increased (e.g. because the driving speed is smaller than the nominal inspection driving speed), the inspection does not result in the driver and passengers being exposed to a dose that exceeds the maximum inspection dose.

In embodiments of the disclosure, e.g. when inspecting the area of the vehicle which is occupied by people (e.g. the cabin of the vehicle) and the drivers drive at speeds higher than the nominal inspection driving speed, the radiation source is controlled based on the information representative of the speed of the vehicle and the dose remains substantially equal to a predetermined dose, which may be equal to or slightly lower than the maximum allowable dose. The inspection dose rate may be increased when the exposure time is decreased (e.g. because the driving speed is higher than the nominal inspection driving speed), the dose however being still equal to or slightly lower than the maximum allowable dose.

In embodiments of the disclosure, regardless of the inspection speed, the inspection results in an image quality similar to the image quality when inspecting the vehicle at the nominal inspection speed.

The above examples concern inspection of a part of the vehicle including the person-occupied areas of the vehicle. Other predetermined inspection doses may correspond to other parts of the vehicle, such as parts including an engine or parts including a trailer or a boot being configured to carry cargo. Embodiments of the disclosure for these other parts of the vehicle (such as the engine or the trailer) enhance image quality, as the dose may be increased for the parts of the vehicle which are not occupied by people (the dose is not limited to the dose allowable to people).

DETAILED DESCRIPTION OF EXAMPLE EMBODIMENTS

FIG. 1 is a flowchart that schematically illustrates an example method 100 for inspecting a vehicle.

The method 100 illustrated at FIG. 1 mainly includes controlling, at S1, by a controller, an inspection dose of inspection radiation generated by a radiation source such that, during the inspection of at least one part of a vehicle by the inspection radiation, the inspection dose remains substantially equal to a predetermined inspection dose.

In FIG. 1, S1 mainly includes:
- the controller obtaining, at S11, information representative of a speed of a relative movement of an inspection system and the vehicle during the inspection of the at least one part of the vehicle; and
- the controller controlling, at S12, the radiation source, based on the obtained information.

In embodiments of the disclosure, during inspection of the vehicle and drivers of the vehicle drive at speeds lower than the nominal inspection driving speed, the radiation source is controlled based on the information representative of the speed of the vehicle and the dose remains substantially equal to a predetermined dose, which may be equal to or slightly lower than the maximum dose (e.g. a regulatory dose). The inspection does not result in an exposure (e.g. of the people in the vehicle) to a dose that exceeds the maximum inspection dose. In embodiments of the disclosure, during inspection of the vehicle and the drivers drive at speeds higher than the nominal inspection driving speed, the radiation source is controlled based on the information representative of the speed of the vehicle and the dose remains substantially equal to the predetermined dose, which may be equal to or slightly lower than the maximum dose. The inspection results in an image quality similar to the image quality when inspecting the vehicle at the nominal inspection driving speed.

FIG. 2 schematically illustrates an example inspection system 1. The inspection system 1 is configured to inspect at least one vehicle 2. The vehicle 2 may include at least one of a car, a truck or a train, as non-limiting examples.

During inspection, the inspection system 1 and the at least one vehicle 2 move relative to one another, as shown by arrow (OX). In the relative movement (OX), the system 1 may be static with respect to the ground and the vehicle 2 may be moving with respect to the ground (i.e. pass-through mode). Alternatively, in the relative movement (OX), the vehicle 2 may be static with respect to the ground and the system 1 may be moving with respect to the ground (e.g. gantry).

The inspection may be to inspect at least one part 20 of the vehicle 2. In some examples, the at least one part 20 of the vehicle 2 may include a person-occupied area 201 (such as a cabin 201) being configured to be occupied by at least one person (such as a driver of the vehicle 2 and/or passengers of the vehicle 2).

As illustrated in FIG. 2, the inspection system 1 includes a radiation source 11 configured to generate inspection radiation 12. The radiation source 11 may include a pulsed source or a continuous source (such as an X-ray tube as a non-limiting example).

The inspection system 1 also includes detectors 13 configured to detect the transmitted inspection radiation 12 after it has irradiated the vehicle 2.

As illustrated in FIG. 2, the radiation source 11 may be configured to be powered by an electrical power source 14, and the radiation source 11 is connected to the electrical power source.

As illustrated in FIG. 2, a sensor 16 is configured to generate information representative of a speed of the relative movement (OX) of the system 1 and the vehicle 2 during the inspection of the at least one part 20 of the vehicle 2. The sensor 16 may be any type of sensor 16, and may include, as non-limiting examples, at least one of: a Doppler sensor, a Radar, a Lidar or a camera. The sensor 16 could also use image information.

As illustrated in FIG. 2, the inspection system 1 also includes a controller 15. The controller 15 is configured to obtain the information representative of the speed of the relative movement (OX) of the system 1 and the vehicle 2, e.g. from the sensor 16. The controller 15 is also configured to control the radiation source 11, based on the obtained information. In some examples the controller 15 may be configured to control the radiation source 11 through an interface (e.g. Ethernet interface).

In an example, the radiation source 11 may be configured to generate the inspection radiation 12 with a current intensity I. The radiation source 11 may be an X-ray radiation source (such as an X-ray source or an X-ray source including a linac or a betatron). In that case, the current is an electron current, and the electrons impinge unto a target (with the intensity I) to generate the X-ray radiation 12. Alternatively or additionally, the radiation source 11 may be a neutron radiation source. In that case, the current is at least one of a proton current or a deuteron current, and the particles (protons or deuterons) impinge unto a target with the intensity I to generate the neutron radiation 12.

In that case, as shown in FIG. 1 controlling at S12 the radiation source 11 may include controlling the current intensity I based on the obtained information. When the current intensity I impinging the target in the source 11 increases, the number of X-rays generated by the radiation source 11 also increases, and the dose irradiating the vehicle 2 increases linearly.

In that case, the predetermined inspection dose $D_0$ may be associated with a nominal current intensity $I_0$ and a nominal inspection speed $V_0$ of the relative movement (OX).

The inspection dose D received by the vehicle 2 during the inspection varies along with the speed V of the relative movement (OX). For example, the inspection dose D received by the vehicle 2 is greater than the predetermined inspection dose $D_0$ when the speed V of the mutual movement (OX) is lower than the nominal inspection speed $V_0$. Similarly, the inspection dose D received by the vehicle 2 is lower than the predetermined inspection dose $D_0$ when the speed V of the mutual movement (OX) is greater than the nominal inspection speed $V_0$.

In some examples, the predetermined inspection dose $D_0$ corresponds to a person-occupied area (such as the cabin) inspection dose $D_{0person}$. It should be understood that the person-occupied area inspection dose $D_{0person}$ is lower than or substantially equal to a regulatory dose which is safe for the at least one person occupying the area 201 during the inspection of the area 201. The person (e.g. the driver or the passenger) may thus be exposed to the person-occupied area inspection dose $D_{0person}$. However, the person-occupied area inspection dose $D_{0person}$ enables inspection by irradiation of the area 201 by the inspection radiation 12. In some examples corresponding to the ANSI N43.17 standard, the regulatory dose corresponds to a dose substantially equal to 250 nSv per inspection. Other standards, regulatory doses and person-occupied area inspection doses may also be envisaged. An example is shown in FIG. 4.

In that example, the controller 15 controls at S12 the current intensity I of the radiation source 11, based on the obtained information representative of the speed V of the mutual movement, such that:

$$I = \frac{V}{V_0} I_0$$

Therefore, by such a controlling of the intensity I, the inspection dose of the inspection radiation 12, during the inspection of the person-occupied area 201 of the vehicle 2 by the inspection radiation 12, remains substantially equal to the predetermined inspection dose $D_{0person}$.

The method 100 may be performed by the controller 15 in real time or near real time.

Alternatively or additionally, in some examples, the at least one part 20 of the vehicle 2 may include an engine 202 being configured to cause movement of the vehicle 2. The engine 202 is denser than the person-occupied area 201 and is not configured to be occupied by a person. The predetermined inspection dose $D_0$ may thus correspond to an engine inspection dose $D_{0engine}$ enabling inspection by irradiation of the engine by the inspection radiation. It should be understood that:

$$D_{0engine} \gg D_{0person}$$

Similarly to the control performed by the controller 15 during inspection of the person-occupied area 201, during inspection of the engine 202 of the vehicle 2, the controller 15 may control at S12 the intensity I of the radiation source 11, such that the inspection dose rate of the inspection radiation 12 remains substantially equal to the predetermined inspection dose rate $D_{0engine}$. An example is shown in FIG. 4.

Alternatively or additionally, in some examples, the at least one part 20 of the vehicle 2 may include at least one of a trailer 203 or a boot 203 being configured to carry cargo. The trailer 203 or boot 203 is denser than the person-occupied area 201 and is usually not configured to be occupied by a person. The predetermined inspection dose $D_0$ may thus correspond to a cargo inspection dose $D_{0cargo}$ enabling inspection by irradiation of the trailer 203 and/or the boot 203 by the inspection radiation by the inspection radiation. An example is shown in FIG. 4.

Similarly to the control performed by the controller 15 during inspection of the person-occupied area 201 and/or of the engine 202, during inspection of the trailer 203 and/or boot 203 of the vehicle 2, the controller 15 may control at S12 the intensity I of the radiation source 11, such that the inspection dose of the inspection radiation 12 remains substantially equal to the predetermined inspection dose $D_{0cargo}$.

A typical dose to cargo $D_{0cargo}$ or to engine $D_{0engine}$ may be several µSv per scan as a non-limiting example.

In the developments above, the controller 15 is configured to control the current intensity of the radiation source 11. As already stated, the radiation source 11 may include a pulsed source 11, the pulsed source 11 being configured to generate the inspection radiation 12 at a frequency f.

In that case, controlling at S12 the radiation source 11 may include controlling the frequency f of the radiation source, based on the obtained information. In some examples the controller 15 may be configured to instruct the radiation source 11 to adjust the frequency f. When the frequency f increases, the number of X-rays generated by the radiation source 11 also increases, and the dose irradiating the vehicle 2 increases linearly.

In that case, the predetermined inspection dose $D_0$ ($D_{0engine}$ and/or $D_{0cargo}$ and/or $D_{0person}$) is associated with a nominal radiation source frequency $f_0$ and a nominal inspection speed $V_0$ of the relative movement (OX).

In that example, the controller 15 controls at S12 the frequency f of the radiation source 11 such that, based on the obtained information representative of the speed V of the relative movement:

$$f = \frac{V}{V_o} f_o.$$

Therefore, by such a controlling of the frequency f, the inspection dose of the inspection radiation 12, during the inspection of the part 20 of the vehicle 2 by the inspection radiation 12, remains substantially equal to the predetermined inspection dose $D_0$ ($D_{0engine}$ and/or $D_{0cargo}$ and/or $D_{0person}$ depending on the part 20 of the vehicle 2).

In the developments above, the controller 15 is configured to control the current intensity and/or the frequency of the radiation source 11.

In some examples, the radiation source 11 is configured to generate the inspection radiation 12 at a radiation energy E. When the energy E increases, the energy of the X-rays generated by the radiation source 11 also increases, and the dose irradiating the vehicle 2 increases.

In that example, the controller 15 controls at S12 the radiation energy E at which the source generates the inspection radiation.

In cases where the predetermined inspection dose $D_0$ is associated with a nominal radiation energy $E_0$ and a nominal inspection speed $V_0$ of the relative movement (OX), controlling at S12 the radiation energy E is such that, based on the obtained information representative of the speed V of the mutual movement:

$$E = F\left(\frac{V}{V_0} E_0\right).$$

where F is a function configured to maintain the dose substantially equal to Do.

In this case, the penetration of the radiation 12 would change because the penetration depends strongly with the radiation energy. Other performance metrics will also change.

In some examples controlling the energy E includes controlling the voltage to which the electrons and/or the particles (e.g. protons or deuterons) are submitted in the radiation source 11. With an increased voltage, the electrons and/or the particles (e.g. protons or deuterons) have increased energy that translates to higher energy of the radiation source 11.

In the developments above, the source 11 is configured to be powered by the power source 14. Alternatively or additionally, the radiation source 11 is a radioactive source (such as including an isotopic source).

Alternatively or additionally, a method to adjust the dose based on the obtained information representative of the speed is using filters.

As shown in FIGS. 3A, 3B and 3C, in some embodiments, the radiation source 11 may include a filter 150 configured to interact with the inspection radiation and the controller 15 may include an actuator 151 of the filter 150.

In such an example, controlling at S12 the radiation source includes controlling, based on the obtained information, at least one of a thickness and a material of the filter. In some examples the filter may include at least one absorbing material with at least one thickness, and the position of the filter with respect to the radiation is controlled by the controller to control the position of the at least one absorbing material with the corresponding at least one thickness, such that the inspection dose remains substantially equal to the predetermined inspection dose during the inspection of the at least one part of the vehicle.

As illustrated in FIG. 3A, in some embodiments the radiation source 11 may include a filter including a plurality N of plates 150, e.g. with similar or different thicknesses and/or similar or different materials, and the controller 15 may include a plurality N of independent actuators 151 configured to introduce and/or remove one or more of the plates 150 into/from the radiation beam.

An example embodiment according to FIG. 3A may work as follows.

A total thickness T of all the plates 150 may be such that the dose at the lowest relative speed may be just below the regulatory dose. As the relative speed increases, some plates 150 may be removed to increase the output dose rate to a point that the object dose is substantially maintained without exceeding the regulatory dose. In some examples, all the plates 150 of the filter may be removed when scanning the cargo.

Alternatively or additionally, as illustrated in FIG. 3B, in some embodiments the radiation source 11 may include a filter including a multiplicity of steps 150, and the controller 15 may include an actuator 151 configured to produce different displacements of the filter with respect to the radiation beam.

In the example of FIG. 3B, there are four steps 150 corresponding to four thicknesses of the filter, but other numbers of steps may be envisaged.

An example embodiment according to FIG. 3B may work as follows.

A specific step 150 of the filter (i.e. the thickness of the filter) interacting with the radiation beam may be selected based on the relative speed (e.g. from 2 km/h to 8 km/h).

A thinnest step 150 may have a thickness corresponding to a highest dose rate configured not to exceed 240 nSv/scan at 6 km/h. It may be selected for trucks moving in the speed range of 6 km/h to 8 km/h. This may result in an object dose of 180 nSv/scan at 8 km/h, linearly increasing to 240 nSv/scan as the truck slows down to 6 km/h.

A second filter step 150 may have a thickness corresponding to a dose rate not to exceed 240 nSv/scan at a speed of 4 km/h. It may be selected for speeds of 4 km/h to 5.99 km/h. This may result in an object dose of 160 nSv/scan at 5.99 km/h, linearly increasing to 240 nSv/scan as the truck slows down to 4 km/h.

A third filter step 150 may have a thickness corresponding to a dose rate configured not to exceed 240 nSv/scan at a speed of 3 km/h. It may be selected for speeds of 3 km/h to 3.99 km/h. This may result in an object dose of 180 nSv/scan at 3.99 km/h, linearly increasing to 240 nSv/scan as the truck slows down to 3 km/h.

A thickest filter step 150 may have a thickness corresponding to a dose rate configured not to exceed 240 nSv/scan at a speed of 2 km/h. It may be selected for speeds of 2 km/h to 2.99 km/h. This may result in an object dose of 160 nSv/scan at 2.99 km/h, linearly increasing to 240 nSv/scan as the truck slows down to 2 km/h.

In examples where the radiation source is pulsed, the actuator 151 may be configured to displace the filter between pulses of radiation. These embodiments are most suitable for pulsed sources.

To maintain the dose more constant with speed, additional steps may be used.

Alternatively or additionally, as illustrated in FIG. 3C, in some embodiments the radiation source 11 may include a triangular-shaped block 150, and the controller 15 may include an actuator 151 configured to produce different displacements with respect to the radiation beam, so that the thickness of the filter may be adjusted continuously with speed.

This embodiment is most suitable for continuous sources with small focal spots.

In any aspect of the disclosure, the method may further include collimating the inspection radiation into an inspection beam configured to irradiate the vehicle.

The controller 15 is configured to perform the method of any aspect of the disclosure. The controller 15 may include a processor and a memory, the memory storing instructions which, when executed by the processor, enable the processor to perform the method of any aspect of the disclosure.

The disclosure also relates to a computer program product or a computer program including instructions which, when executed by a processor, enable the processor to perform the method of any aspect of the disclosure.

It should be understood that the performance metrics of the inspection system (including penetration, spatial resolution, wire detection, contrast, material discrimination, etc.) are related to the inspection dose.

What is claimed is:

1. A method for inspecting at least one vehicle with an inspection system, the inspection system and the at least one vehicle being configured to move relative to one another during an inspection of at least one part of the vehicle, the method comprising:

controlling, by a controller, an inspection dose of inspection radiation generated by a radiation source such that, during the inspection of the at least one part of the vehicle by the inspection radiation, the inspection dose remains substantially equal to a predetermined inspection dose, wherein the radiation source includes a filter configured to interact with the inspection radiation, wherein controlling the inspection dose comprises:

the controller obtaining information representative of a speed of the relative movement of the system and the vehicle during the inspection of the at least one part of the vehicle; and the controller controlling the radiation source, based on the obtained information, by changing a thickness of the filter, the filter including a plurality of parallel plates having different thicknesses, and the controller including a plurality of actuators, wherein each actuator is configured to independently move an associated plate of the plurality of parallel plates to change the thickness of the filter.

2. The method of claim 1, wherein the radiation source is configured to be powered by an electrical power source and to generate the inspection radiation with a current intensity I, and wherein controlling the radiation source further comprises controlling the current intensity I based on the obtained information.

3. The method of claim 2, wherein the predetermined inspection dose is associated with a nominal current intensity $I_0$ and a nominal inspection speed $V_0$ of the relative movement, and wherein controlling the current intensity I is such that, based on the obtained information representative of a speed V of the mutual movement:

$$I = \frac{V}{V_0} I_0.$$

4. The method of claim 1, wherein the radiation source comprises a pulsed source or a continuous source.

5. The method of claim 1, wherein the radiation source is configured to be powered by an electrical power source and comprises a pulsed source configured to generate the inspection radiation at a frequency f, and wherein controlling the radiation source further comprises controlling, based on the obtained information, the frequency f of the radiation source.

6. The method of claim 5, wherein the predetermined inspection dose is associated with a nominal radiation source frequency $f_0$ and a nominal inspection speed $V_0$ of the relative movement, and wherein controlling the frequency f is such that, based on the obtained information representative of a speed V of the relative movement:

$$f = \frac{V}{V_o} f_o.$$

7. The method of claim 1, wherein the radiation source is configured to be powered by an electrical power source and to generate the inspection radiation at a radiation energy E, and wherein controlling the radiation source further comprises controlling, based on the obtained information, the radiation energy E at which the source generates the inspection radiation.

8. The method of claim 7, wherein the predetermined inspection dose is associated with a nominal radiation energy $E_0$ and a nominal inspection speed $V_0$ of the relative movement, and wherein controlling the radiation energy E is such that, based on the obtained information representative of a speed V of the mutual movement:

$$E = F\left(\frac{V}{V_0} E_0\right)$$

where F is a function configured to maintain the dose substantially equal to the predetermined inspection dose.

9. The method of claim 7, wherein the radiation source comprises a pulsed source or a continuous source.

10. The method of claim 1, wherein:

the radiation source is an X-ray radiation source and the current is an electron current, with electrons impinging unto a target to generate the X-ray radiation; and the radiation source is a neutron radiation source and the current is at least one of a proton current or a deuteron current, with particles impinging unto a target to generate the neutron radiation.

11. The method of claim 1, wherein the at least one part of the vehicle comprises an area being configured to be occupied by a person, and wherein the predetermined inspection dose corresponds to a person-occupied area inspection dose, the person-occupied area inspection dose being lower than or substantially equal to a regulatory dose which is safe for the person occupying the area during the inspection of the area, yet enabling inspection by irradiation of the area by the inspection radiation.

12. The method of claim 1, wherein the at least one part of the vehicle comprises an engine being configured to cause movement of the vehicle, and wherein the predetermined inspection dose corresponds to an engine inspection dose enabling inspection by irradiation of the engine by the inspection radiation.

13. The method of claim 1, wherein the at least one part of the vehicle comprises at least one of a trailer or a boot being configured to carry cargo, and wherein the predetermined inspection dose corresponds to a cargo inspection dose enabling inspection by irradiation of the trailer and/or a boot by the inspection radiation.

14. The method of claim 1, wherein the information is obtained from a sensor comprising at least one of: a Doppler sensor, a Radar, a Lidar, an infra-red sensor, or a camera.

15. The method of claim 1, performed by the controller in real time or near real time.

16. An inspection system configured to inspect at least one vehicle, the inspection system and the vehicle being configured to move relative to one another during an inspection of the vehicle, the system comprising:

a radiation source configured to generate inspection radiation at an inspection dose enabling inspection of at least one part of the vehicle by the inspection radiation, the radiation source comprising a filter configure to interact with the inspection radiation; and a controller configured to control, based on information obtained from a sensor configured to determine information representative of a speed of the relative movement of the system and the vehicle during the inspection of the vehicle, the inspection dose of the inspection radiation generated by the radiation source such that, during the inspection of the at least one part of the vehicle by the inspection radiation, the inspection dose remains substantially equal to a predetermined inspection dose, wherein controlling the inspection dose comprises controlling the radiation source, based on the obtained information, by changing a thickness of the filter, the filter comprising a plurality of plates having different thicknesses, and the controller comprising a plurality of actuators, wherein each actuator is configured to independently move an associated plate of the plurality of parallel plates to change the thickness of the filter.

17. The system of claim 16, wherein the radiation source is configured to be powered by an electrical power source and comprises at least one of: an X-ray source, an X-ray source comprising a linac or a betatron, or a neutron source.

\* \* \* \* \*